May 2, 1933.   J. J. SZEPE   1,906,287
GEAR SHIFT FOR MOTOR VEHICLES
Filed Sept. 19, 1929   8 Sheets-Sheet 1

Fig. 1.

INVENTOR

Fig. 2.

May 2, 1933.   J. J. SZEPE   1,906,287
GEAR SHIFT FOR MOTOR VEHICLES
Filed Sept. 19, 1929   8 Sheets-Sheet 3

INVENTOR
Joseph J. Szepe
by his Attorneys
Byrnes, Stebbins, Parmelee & Blenko

May 2, 1933.  J. J. SZEPE  1,906,287
GEAR SHIFT FOR MOTOR VEHICLES
Filed Sept. 19, 1929   8 Sheets-Sheet 4

INVENTOR
Joseph J. Szepe
by his attorneys

May 2, 1933.  J. J. SZEPE  1,906,287

GEAR SHIFT FOR MOTOR VEHICLES

Filed Sept. 19, 1929  8 Sheets-Sheet 8

INVENTOR
Joseph J. Szepe
by his attorneys
Byrnes, Stebbins, Parmelee & Klenke

Patented May 2, 1933

1,906,287

UNITED STATES PATENT OFFICE

JOSEPH J. SZEPE, OF PITTSBURGH, PENNSYLVANIA

GEAR SHIFT FOR MOTOR VEHICLES

Application filed September 19, 1929. Serial No. 393,621.

This invention is for a gear shifting mechanism for motor vehicles, and relates to that type of mechanism in which the shifting is effected automatically through the operation of the clutch pedal without resorting to the use of the gear shift lever now commonly provided.

Various gear shifting devices of this nature have heretofore been devised, but such devices possess various disadvantages. Many of them do not possess the flexibility which is required of a gear shift in the driving of a car. While it is possible to advance from neutral through the various speeds to high, it is not possible with many of them to go from high into second or from second into first.

Other such devices are open to the objection that there is no assurance of the gears staying in the position to which they are set after they have once been moved to this position. For instance, in many cars there is a natural tendency for the gears to become disengaged, especially when driving in second gear. Inasmuch as second gear is frequently used in descending steep grades tending to retard the acceleration of the vehicle, it is important that any gear shifting device insure the gears staying in mesh, and as previously stated many so-called automatic gear shifts which have heretofore been proposed do not prevent the gears from becoming disengaged. Other devices are of extremely complicated construction, or require the use of delicate parts which render their use on a commercial scale impractical.

According to the present invention there is provided a thoroughly practical semiautomatic gear shift wherein the shifting of the gears to any position can be effected in a predetermined manner. The present invention provides a gear shift in which the gears are prevented from becoming disengaged after they have once been brought into mesh until a definite operation is made to release them. The invention is relatively simple, requiring little alteration of the present standard gear shift, and is capable of being built into transmission units of a size convenient for use on present day motor vehicles. The mechanism is positive in its action throughout, is sufficiently rugged to easily outlast the life of the car and can be included in the transmission with very little additional cost to the manufacturer.

In the present invention, as in other mechanical gear shift devices of this nature, the actual shifting of the gears is effected through the operation of the clutch pedal. To this end the clutch pedal is arranged with a lost motion connection to the transmission in such manner that the pedal can be depressed far enough to disengage the clutch without actually effecting a change of the gear setting. When the clutch pedal is pressed beyond a point sufficient to disengage the clutch the gear changing mechanism is brought into operation. The arrangement therefore prevents any changing of the gears while the clutch is engaged. It also allows for the free play of the clutch for driving purposes.

The changing of the gears upon the full depresssion of the clutch pedal is further dependent upon the action of a selector. The clutch pedal can be fully depressed, and if the selector does not change its position upon the full depression of the clutch, no shifting of the gears will be effected, but if the selector moves to a different position upon the full depression of the clutch, shifting of the gears will take place according to the movement of the selector. This arrangement therefore prevents any shifting of the gears when it is not desired to do so even though the clutch pedal may be depressed too far. An escapement mechanism is provided whereby any movement of the selector to high speed is in a step by step progression, and only one shift toward high gear can be effected with each operation of the clutch to the fully depressed position. This arrangement prevents the gears from being shifted in an unnatural progression. The arrangement is such however that an immediate shift may be made from high to neutral on a single actuation of the clutch.

The invention provides means for effecting the movement of the selector. According to the preferred embodiment of the invention this means is under the control of a manually adjustable element which may be conveniently mounted on the steering post or the dash of the vehicle, where it is most accessible to the operator and out of the way of the passengers in the car. Adjustment of the manual control by the operator provides for the movement of the selector to a predetermined station.

The invention further contemplates an arrangement whereupon the gears are always set to neutral in passing from one gear setting to the next. In this arrangement the invention follows the method of operation of a hand gear shift wherein the operating lever passes through the neutral position in moving from any gear setting to another. The invention also provides means wherein the change of gearing is effected without clashing or grinding of the gears, thereby constituting a considerable improvement over the present method wherein the gears clash and grind until they mesh. With the present invention the change in the gears can be effected silently.

The invention may be more fully understood by reference to the accompanying drawings which show a present preferred embodiment of the invention adapted to the gear shift of the standard Buick automobile. It will be understood that the invention is equally applicable to the gear shifts of other automobiles, the Buick being shown merely because it is to this type of gear shift that the invention has already been successfully applied and because it is representative of the standard gear shift.

Figure 2:
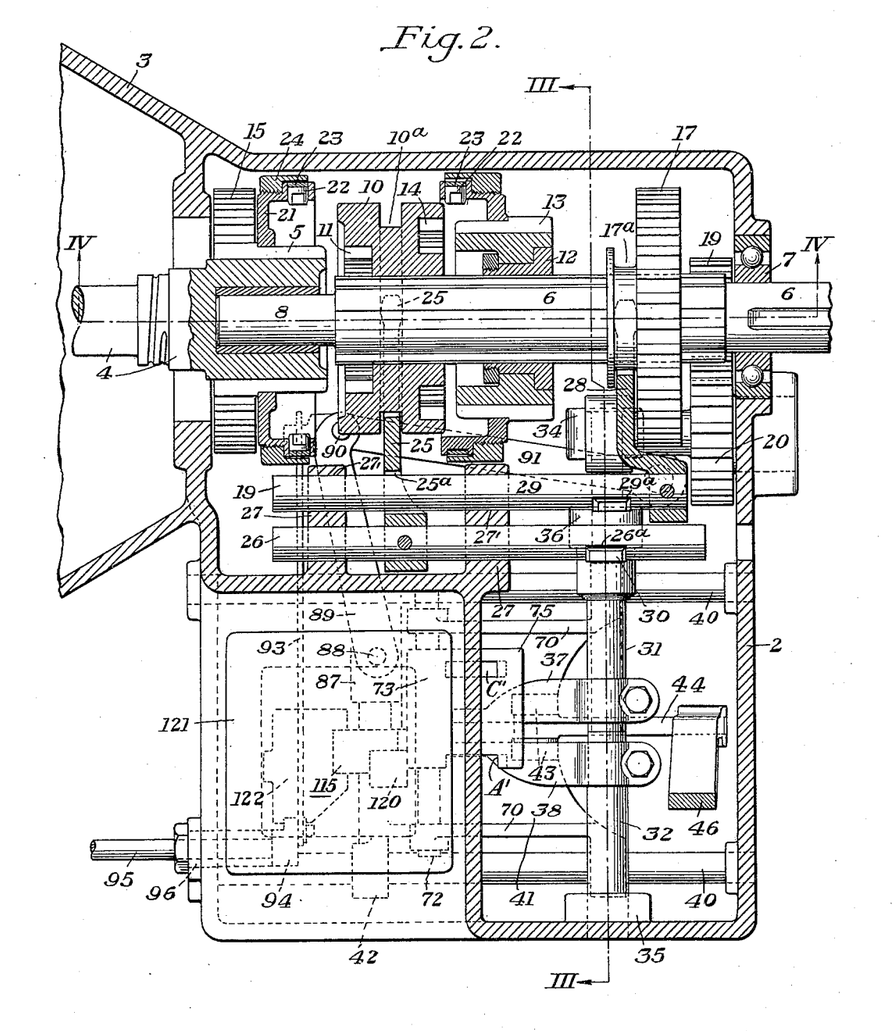
Figure 2 is a horizontal section.
Figure 4:
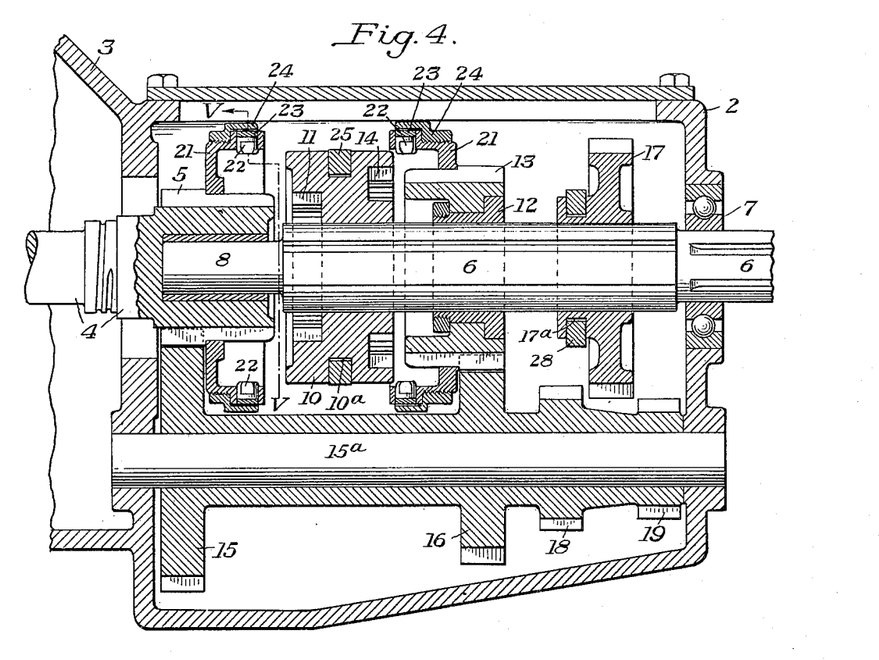
Figure 4 is a longitudinal vertical section in substantially the plane of line IV—IV of Figure 2.
Figure 5:
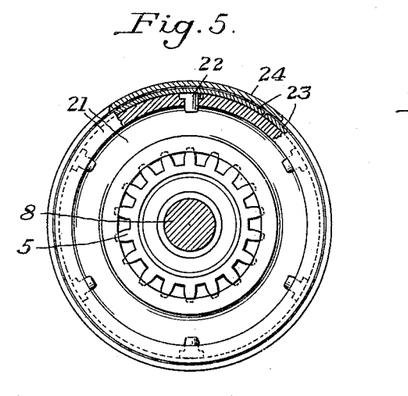
Figure 5 is a detail view representing a section substantially in the plane of line V—V in Figure 4.

The transmission is of the standard type. It comprises a casing 2 at the rear of the clutch housing 3. The driving shaft 4 projects into the forward end of the casing as shown in Figures 2 and 4 and is provided with gear teeth 5. The driven shaft 6 is in line with the driving shaft, and projects into the casing from the opposite direction. It has a bearing in the casing at the rear end of the casing at 7, and its forward end has a reduced extension 8 that projects into and has a bearing in the rear end of the driving shaft 4, as shown in Figures 2 and 4. Splined on the driven shaft 6 is a gear member 10 having internal teeth 11 adapted to mesh, when the gear member 10 is shifted to the left as viewed in Figures 2 and 4 with the teeth 5 on the end of the driving shaft 4.

When the teeth 11 are meshing with the teeth 5 there is a direct drive from the driving shaft 4 to the driven shaft 6, and this is the so-called high speed position of the gear shift.

Fixed on the shaft 6 is a bushing 12 which provides a bearing for a gear 13, the gear 13 being thus loosely mounted for rotation on the shaft 6. The gear member 10 is provided with an internal series of teeth 14, and when the gear member 10 is shifted to the right as viewed in Figures 2 and 4 the teeth 14 mesh with the teeth of the gear 13.

The gear 5 on the shaft 4 drives a larger gear 15. This gear 15 is directly connected with a gear 16 of smaller diameter, and this gear 16 meshes with the gear wheel 13. The gear wheel 13 has a larger diameter than the gear 5, so that it is always rotated at a relatively slower speed than the gear 5. When the gear teeth 14 are engaged with the teeth of the gear 13, the driven shaft 6 is operated at a relatively slower speed than the driving shaft 4. This is the so-called second speed of a standard gear shift.

Splined on the shaft 6 is a third gear wheel 17 of larger diameter than the gear 13. When the gear 17 is shifted to the left, from the position shown in Figure 4, its teeth engage a gear wheel 18 on the shaft 15a which also carries the gears 15 and 16. The gear 18 is directly connected with the gears 15 and 16 and when the gear 17 is meshed with the gear 18 the shaft 6 is driven at a relatively lower speed. The gears are then in the so-called low position.

When the gears are in the position shown in Figures 2 and 4 there is no driving connection between the shaft 4 and the shaft 6, and the transmission is in neutral. Connected with the gears 15, 16 and 18 is another gear 19 which drives an idling gear 20 shown in Figure 2. When the gear 17 is shifted to the right from the position shown in Figures 2 and 4 it engages the idling gear 20, shown only in Figure 2, and the direction of rotation of the shaft 6 is the reverse of the direction of rotation of the shaft 4. This is the reverse setting for the transmission.

Figure 6:
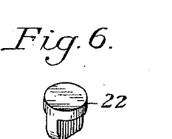
Figure 6 is a detail view of one of the friction pins in the assembly shown in Figure 5.

Carried on the gear wheel 5 is a flanged disc 21. In the flange of this disc are a plurality of shouldered pins 22 shown in detail in Figure 6. Outside the flange of the disc 21 is a split resilient ring 23 bearing against the outer ends of the shouldered pins 22. A retaining ring 24 is screwed onto the flange of the disc 21 to hold the split ring 23 in place. The gear 13 carries a similar flanged disc with similar pins and like reference numerals have been used to designate the corresponding parts.

When the gear member 10 is shifted to the left as viewed in Figures 2 and 4 the periphery of the member 10 forces these pins radially outward a very slight extent against the resilience of the split ring 23. This establishes a frictional driving relation between the member 10 and the gear 5 just slightly in advance of the time when the gears 5 and 11 mesh, slowing the speed of rotation of the gear 5 down to the speed of rotation of the gear 10, or increasing the speed of rotation of the gear 5 to the speed of rotation of the gear 10. This is possible because of the fact that the clutch to the driving shaft 4 is disengaged at the time the shifting of the gears takes place. Likewise when the gear 10 is shifted to the right from the positions as shown in 2 and 4 the speed of the gear 13 is synchronized with the speed of the gear 10, which is of course rotating by reason of the forward movement of the car. The provision of this synchronizing mechanism in the second and high speed positions provides for a transmission in which the changing of gears can be effected with practically no clashing or grinding of the gears, and facilitates the operation of the gear shifting mechanism.

In order to shift the gears, the gear 10 has a peripheral groove 10a in which a shifting yoke 25 engages. The shifting yoke 25 is carried on a longitudinally movable rod 26, slidably mounted in bearings 27. The shifting of the gear 17 is effected by means of a yoke 28 engaging in a peripheral groove 17a on the gear, the yoke 28 being carried on another longitudinally movable rod 29, the rod 29 being parallel with the rod 26, and being slidably mounted in bearings 27'. The yoke 25 has an opening 25a therein through which the rod 29 passes, the yoke 25 being entirely clear of the shifting rod 29.

Figure 3:
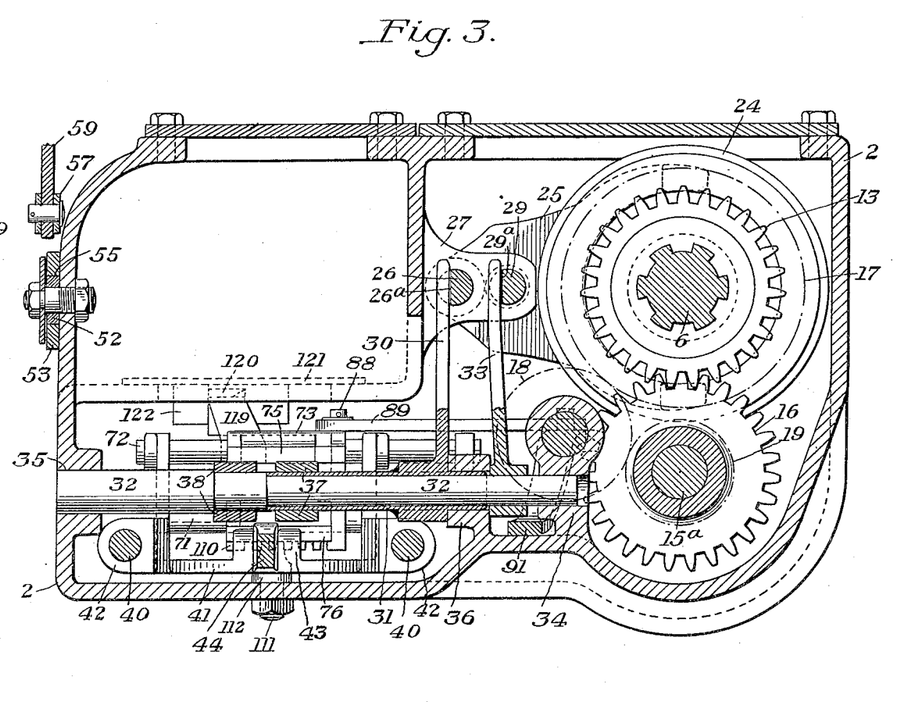
Figure 3 is a transverse vertical section in substantially the plane of line III—III of Figure 2.

Longitudinal movement of the shaft 26 is effected by means of an arm or lever 30 whose free end is received in a recess or notch 26a in the rod 26. This arm or lever 30 is carried on a hollow shaft 31 (see Fig. 3).

The hollow shaft or sleeve 31 is loosely carried on a solid shaft 32. This solid shaft carries a lever 33 similar to the lever arm 30, and the lever arm 33 engages in a notch 29a in the shifting rod 29. The shaft 32 has a bearing in the bearing lug 34 which is cast integral with the casing, and it has a bearing at 35 in the casing at its opposite end. An additional bearing 36 supports the sleeve 31.

By rotation of the sleeve 31 through a limited arc the rod 26 can be shifted back and forth to shift the gear 10 to the left or to the right, and by similar oscillation of the shaft 32 through a slight arc the gear 17 can be shifted to the left or right.

Carried on the hollow shaft 31 is an actuating arm 37 by means of which the sleeve 31 can be rotated for shifting the rod 26 back and forth. Carried on the shaft 32 is a similar actuating arm 38 by means of which the shaft 32 may be oscillated through a limited arc to effect the shifting movement of the rod 29. The actuating levers 37 and 38 extend in a plane at right angles to the arms 30 and 33, but are located side by side as shown in Figure 2.

The movement of the actuating levers 37 and 38 up or down from the neutral position is determined by the selector mechanism comprising a part of the invention and which will now be described.

The selector is under the control of two different mechanisms. One mechanism is actuated from the clutch pedal and the other includes a control lever conveniently mounted on the steering post, the dash or elsewhere on the vehicle adjacent the driver's seat. These two mechanisms are co-ordinated to effect the desired result.

Figure 8:
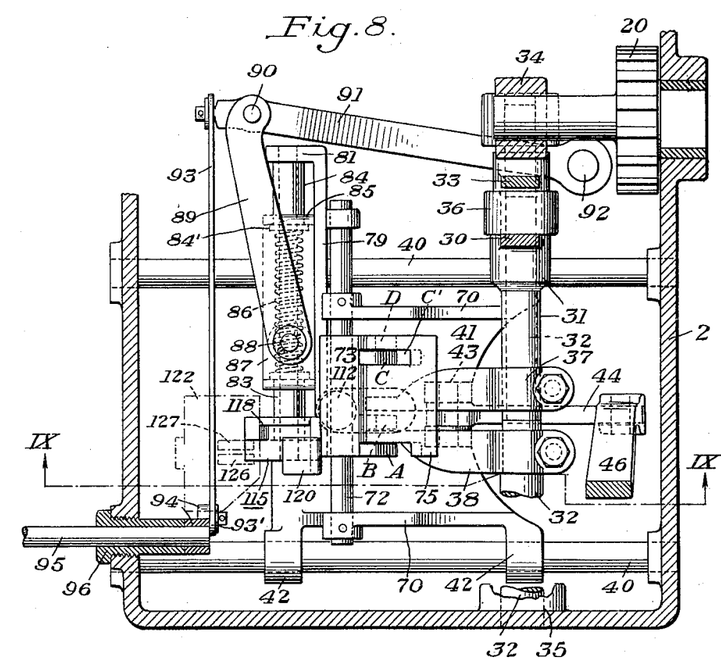
Figure 8 is a fragmentary view on a larger scale showing a plan view of the selector mechanism and a portion of the gear shifting mechanism.
Figure 9:
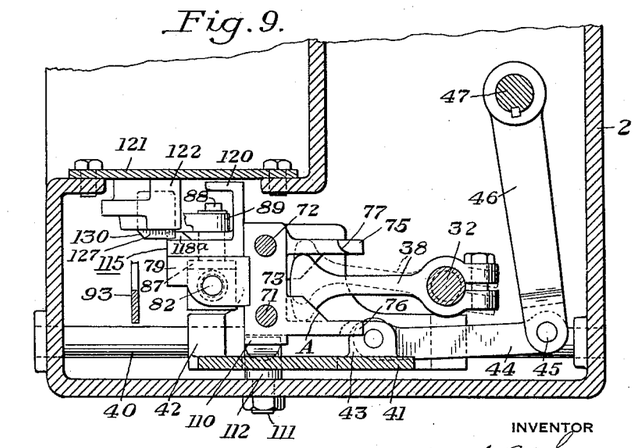
Figure 9 is a transverse vertical section in substantially the plane of line IX—IX of Figure 8.
Figure 10:
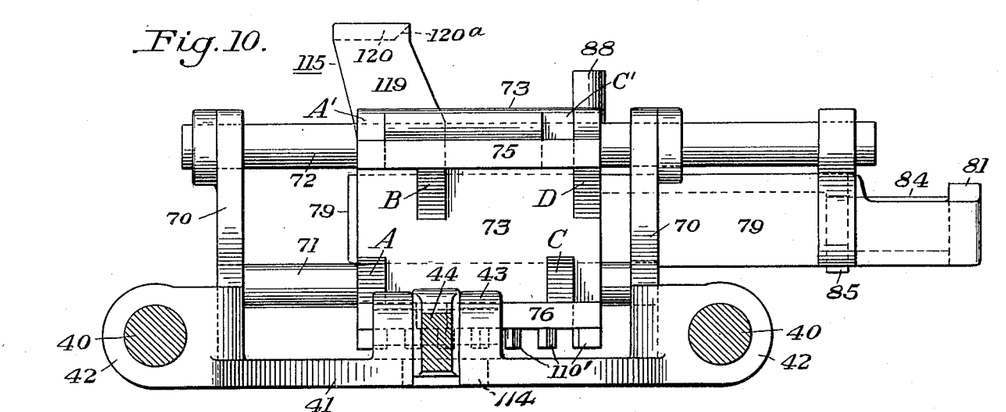
Figure 10 is a full size detail view of the selector.
Figures 11, 12, 13:
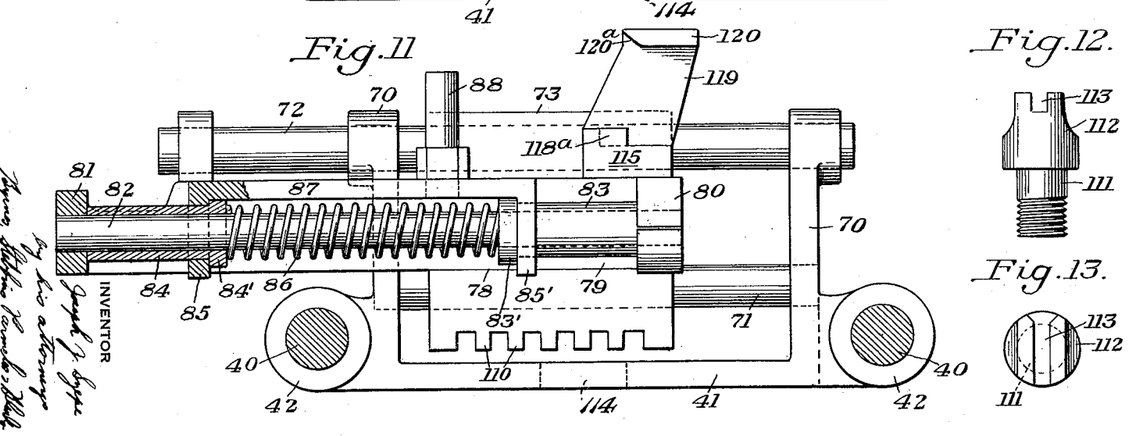
Figure 11 is a view similar to Figure 10 but looking in the opposite direction at the same mechanism.
Figure 12 is a detail view of the selector engaging mechanism which prevents accidental or spontaneous shifting of the gears.
Figure 13 is a top view of the element shown in Figure 12.

Mounted within the casing are a pair of parallel guide rods 40 which are fixed within the casing. These guide rods are parallel with the axes of the driving and driven shafts 4 and 6 respectively. Their disposition in the casing is best shown in Figures 2, 3, 8 and 9, and they are also shown in Figures 10 and 11.

Slidably mounted on the rods 40 is a carriage 41, this carriage having extensions 42 which are bored to slidably fit the guide rods 40. This carriage extends under the operating arms 37 and 38, as best shown in Figures 8 and 9. The carriage may be reciprocated from the position shown in Figure 9 toward the left. Pivotally connected to upstanding lugs 43 on the carriage is a link 44. The other end of the link 44 is pivotally connected at 45 to a crank arm 46. The arm 46 is on a rock shaft 47. The end of the rock shaft 47 projects through the casing, the projecting end of this shaft being shown in Figure 1. Secured to the end of the shaft 47 outside the casing is an arm 48. This arm has a cam slot 49 therein, the right hand portion of the slot, as viewed in Figure 1 being straight, the straight portion being indicated 49a. To the left of the straight portion is a riser portion 49b and beyond this is an elevated retaining portion 49c.

Secured to the rear end of the casing 2 is a bracket 50. This bracket has a guide roller 51 secured thereto, and secured to the side of the casing is a second guide roller 52 (see Fig. 1). Carried on the rollers 51 and 52 between the lever arm 48 and the side of the casing is a slide plate 53. This plate has a slot 54 in which the roller 51 operates and another slot 55 in which the roller 52 operates. Pivotally connected to the slide plate at 56 is an adjustable link 57. The other end of the link 57 is pivotally connected at 58 to a lever 59. The lever 59 is pivotally supported at 60 on a supporting post 61 on top of the transmission housing. A link 62 pivotally connected to the lever 59 between its ends at a point 63 has its other end pivotally connected at 64 to the shank of the clutch pedal 65, (see Figures 1 and 18). The connection through which the clutch of the motor vehicle is operated is indicated at 66. This is the usual arrangement and it need not be specifically described.

On the slide plate 53 is a bracket 67 which carries a roller 68. This roller engages in the cam slot 49 of the arm 48 on the rock shaft 47.

Figure 1:
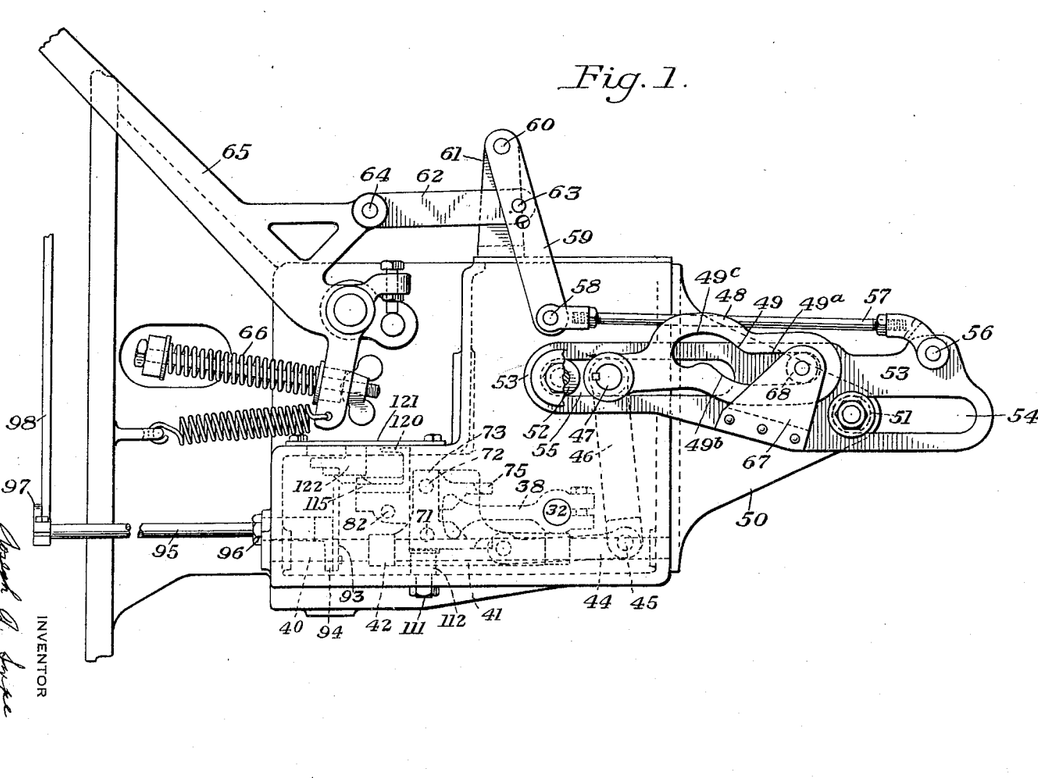
Figure 1 is a side elevation of the complete mechanism.
Figures 18, 19:
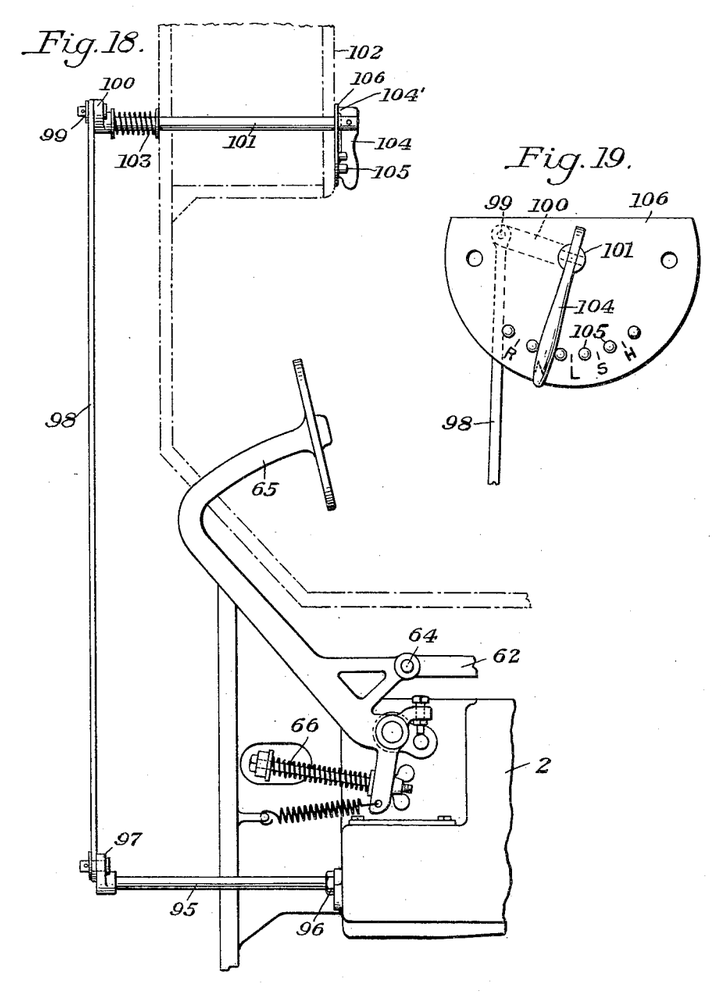
Figure 18 is a schematic view showing the dash board control for the gear shifting unit.
Figure 19 is a front elevation of a segment for the control lever.

When the clutch pedal 65 is depressed from the position shown in Figure 18 the link 62 is pulled to the left as viewed in Figure 1, drawing the link 57 in the same direction. This movement of the link 57 is transmitted to the slide plate 53 causing the slide plate to move to the left as viewed in Figure 1.

During the first part of the movement of the slide plate 53 to the left the roller 68 travels along the straight portion 49a of the slot 49, causing no movement of the arm 48 at all. The slot 49a is of such length that the clutch may be entirely disengaged before the roller reaches the riser portion 49b of the slot. Upon further depression of the clutch pedal the roller 68 engages the riser 49b in the cam, forcing the arm 48 down. The downward movement of the arm 48 rocks the shaft 47. This movement of the shaft 47 is transmitted through the lever 46 and the link 44 to the carriage 41.

When the clutch pedal is released the slide plate 53 moves in the reverse direction and the arm 48 is lifted to the position shown in Figure 1 so that the carriage or slide 41 is pulled back to its normal position before the clutch of the motor vehicle becomes engaged. After the slide 41 has been restored to normal position the roller travels along the straight portion of the cam slot 49 allowing the clutch to engage without further rocking the arm 48.

From the foregoing it will be seen that a mechanism is provided for reciprocating the carriage 41 from the position shown in the drawings toward the left when the clutch pedal is depressed and pulling the carriage back to normal position when the clutch pedal rises, this mechanism providing sufficient lost motion between the clutch pedal and the carriage moving mechanism to permit the clutch to be disengaged upon depression of the pedal before movement is transmitted to the carriage and to allow the carriage 41 to return to normal position before the clutch engages upon the return movement of the clutch pedal.

The carriage 41 has spaced apart upstanding lugs 70 thereon (see Figs. 10 and 11). Supported by these lugs is a lower guide rod 71. These lugs also support an upper guide rod 72 parallel with the rod 71, the rod 72 being longer than the rod 71 and projected beyond one side of the carriage as clearly shown in Figures 10 and 11. It will be noted in Figures 10 and 11 that the rods 71 and 72 are at right angles to the guide rods 40.

Figure 17:
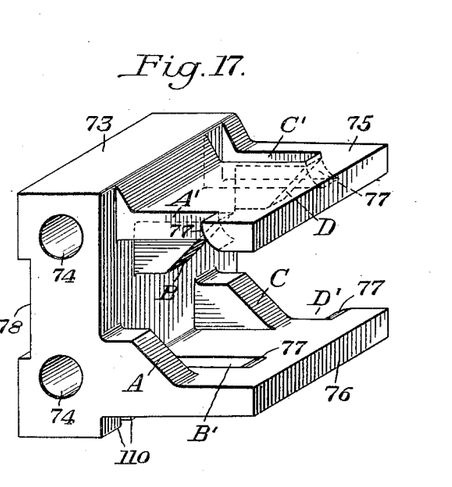
Figure 17 is a detail perspective view showing the selector apart from its mounting.

The guide rods 71 and 72 slidably support the selector block 73, this block being shown in detail in Figure 17. As clearly shown in Figure 17 the block has bored holes 74 therein to receive the rods 71 and 72. This arrangement allows the selector to slide back and forth in a direction which is transverse to the direction in which the carriage 41 slides along the guide rods 40.

The selector block 73 has two parallel flanges 75 and 76 thereon and is provided with four cam surfaces A, B, C, and D.

Cam surfaces A and C are on one side of the block adjacent the flange 76 and cams B and D are on the upper flange 75. The flange 75 has a cut-away portion A' opposite the cam A and a slot C' opposite the cam C. The flange 76 has a slot B' opposite the cam B and a cut-away portion D' opposite the cam D. The outer surfaces of these slots and cut-away portions are in each case rounded to provide cam surfaces, these rounded portions all being designated 77.

When the carriage 41 is in the position shown in the drawings the ends of the actuating levers 37 and 38 project between the flanges 75 and 76 (see Figure 9). The outer ends of these arms 37 and 38 are fan-shaped or flared, as shown in Figure 9 so that the space between the flanges 75 and 76 is just sufficient to receive the flared ends of these actuating arms.

At the back of the block 73 is a recess or groove 78 in which is set a bar 79 having projecting lugs 80 and 81 at opposite ends thereof. Supported between these lugs 80 and 81 is a rod 82. Slidably mounted at each end of the rod are bushings 83 and 84. These bushings slidably project through lugs 85 and 85' on opposite ends of a slidable yoke 87. Bushings 83 and 84 have collars 83' and 84' respectively located between the lugs 85 and 85' of the yoke. Surrounding the rod 82 between the collared or flanged ends of the bushings is a compression spring 86. This spring bears against the inner ends of the two bushings tending to resiliently hold them apart. The bar 79 having the lugs 80 and 81 which support the rod 82 is made separate from the selector block 73 only for the purpose of convenience, but is brazed or otherwise secured onto the selector block so as to be in effect a rigid part thereof. The yoke 87 however is movable back and forth along the rod 82. On the top of the yoke 87 is a rigid stud 88. This stud passes through one end of a link 89. The other end of the link 89 is pivotally connected at 90 to the outer end of a lever 91 which lever is pivotally mounted inside the casing at 92. This arrangement is best shown in Figures 2 and 8.

Connected to the outer end of the lever 91 is another link 93. This link has its other end pivotally connected at 93' to a crank 94 carried on the end of a rock shaft 95, which rock shaft passes through a bushing 96 in the casing 2 (see Figs. 1 and 8). On the outer end of the rock shaft 95, is a crank 97. A link 98 connects the crank 97 with an actuating handle conveniently mounted on the steering post or the dash or some other suitable point on the car. In Figure 18 the link 98 has its upper end connected at 99 to a crank 100 on a rock shaft 101 passing through the cowl of the vehicle and terminating in front of the dash 102. A compression spring 103 is confined between the crank 100 and the front of the dash board. The function of this spring is to urge the shaft 101 to the left as viewed in Figure 18. Secured to the end of the shaft 101 is a small operating handle 104. This handle preferably has a pivotal mounting in the end of the shaft 101, the shaft being bifurcated to receive it. Arranged in the path of movement of the handle 104 are a plurality of stops 105 carried on a segment plate 106. The handle 104 has a heel 104' adapted to bear against the plate 106.

The handle 104 normally is retained between two of the pins 105, but to move the handle, it is lifted away from the segment plate 106. This pulls the rod 101 slightly to the right, as viewed in Figure 18, against the compression of spring 103. When the handle has been lifted clear of the stop pins it can be rotated to rock the shaft 101. Upon release of the handle 104 spring 103 serves to pull the rod 101 to the left and hold the lever in the notch or between the pins to which it has been set. When the shaft 101 is rocked in this manner, motion is transmitted through the crank 99, the link 98, the crank 97, the rock shaft 95 and the link 92 to the lever 91. Motion is transmitted from the lever 91 through the link 89 to the slidable yoke 87.

When the yoke 87 is moved to the left, as viewed in Figure 11 the lug 85 slides along the bushing 84, while the bushing 84 is restrained against movement along the rod 82 by reason of the fact that it rests against the lug 81. At the same time the lug 85' pulls the flanged bushing 83 to the left, compressing the spring 86. When the spring 86 is thus compressed, it will exert an added pressure on the end of the bushing 84 which bushing bears against the lug 81. The lug 81 is rigidly connected with the selector block 73 so that if the selector block is free to slide on the rods 71 and 72 it will be moved to the left as viewed in Figure 11. On the other hand, if the yoke 87 is moved by the operation of the control lever 104 to the right as viewed in Figure 11 the bushing 84 is pulled to the right while the bushing 83 cannot move, and the spring 86 is compressed from the opposite end. When the selector block 73 is free to move, it will be forced by the spring 86 toward the right. The setting of the lever 104 therefore determines whether the selector shall be moved to the left or to the right from the neutral position shown in Figure 11.

On the bottom of the selector block 73 is a series of teeth or projections 110. These teeth extend in the direction of the travel of the carriage 41 along the rods 40. They are pointed at one end, as shown in Figure 10.

Set in the bottom of the casing is a bolt 111 shown in detail in Figures 12 and 13 having a head 112 which has a transverse slot 113 in the top thereof. This bolt projects through a slot 114 in the carriage 41 so that the carriage may reciprocate without interference from the fixed bolt 111. The slot 113 is for cooperation with the teeth 110 on the under side of the selector block. When the carriage is in the normal position shown in Figures 8 and 9 one of the teeth 110 is engaged in the slot 113 in the head of the bolt 111. This prevents lateral movement of the selector block 73 along the rods 71 and 72 as long as the carriage 41 is in the normal position. From the foregoing it becomes apparent that as long as the carriage 41 remains in the normal position, the selector 73 cannot move back and forth along the rods 71 and 72 because of the inter-fitting engagement of the teeth 110 and the groove 113. Therefore it is possible to move the control lever 104 to any position, compressing the spring 86, but the compression of the spring 86 cannot be effective for moving the selector until the selector has been disengaged from the holding member 112.

When the clutch pedal is depressed and the carriage 41 is moved to the left, as viewed in Figure 9, the selector block, being mounted on the carriage will also be carried to the left as viewed in Figure 9, a distance sufficiently far for the teeth 110 to entirely clear the member 112. Therefore, as soon as the clutch pedal has been depressed all the way and the teeth 110 are clear of the groove 113 the spring 86 may act to move the selector to the left or the right, according to the setting of the control lever 104.

When the control lever 104 is in the neutral position, which is the position marked "N" on the segment plate 106 in Figure 19, the two actuating levers 37 and 38 are out of alignment with any of the cams A, B, C, or D on the selector block 73. If the selector block 73 remains in the neutral setting, no amount of actuation of the clutch pedal will change the position of the actuating arms 37 or 38. The selector block with its cams will merely move back and forth with respect to the ends of these levers. If, however, the selector block is moved by the actuation of the spring 86 out of the neutral position one of the cams A, B, C, or D, depending upon the movement of the selector, will come into line with one of the flared ends of the actuating levers 37 or 38. Therefore, when the carriage moves back to its normal position one of these cams will strike one of the levers 37 or 38 and rock it down or lift it, as the case may be. For instance, the cam A will serve to lift the lever 38 while the cam B will serve to depress this lever. Cam C will raise the lever 37 and cam D will depress it. The cutaway portions A', B', C' and D' provide the necessary clearance to permit the levers 37 and 38 to rock up or down as the case may be. The positioning of the cams A, B, C and D is such that it is only possible to operate one of the levers 37 or 38 at a time while the other must remain in neutral. It is never possible for both of the levers 37 and 38 to be actuated at the same time.

The rocking of the levers 37 and 38 in this fashion will effect a movement of the gear shifting yokes 25 or 28, as the case may be, in one direction or the other from neutral, effecting the necessary shifting of the gears. If one of the operating levers 37 or 38 is rocked up or down from the neutral position by one of the cams A, B, C, or D, the opposite side of the flared portion of the lever will project into one of the clearance spaces or slots A', B', C', or D'. When the carriage 41 is operated with one of the arms 37 or 38 out of the normal position the movement of the carriage to the left as viewed in Figure 9 causes the cam surface 77 to engage the flared end of the operating lever which is out of the neutral position and forces such lever back into the neutral position. This will be evident upon an inspection of the full and dotted line positions of the lever positions in Figure 9. This arrangement provides that the gearing must always automatically go to neutral before a shift to any other position can be effected.

In the selector, the cam A is intended to raise the operating lever 38 to throw the transmission into reverse. The cam B is intended to depress the lever 38 to put the transmission in low or first speed. The cam C is provided for raising the lever 37 to throw the gearing into second, while the cam D depresses the lever 38 to shift into high.

To bring the cam A into operative position the selector block 73 must move to the left as viewed in Figure 11, or to the right as viewed in Figure 10. To bring any of the other cams B, C, or D into position the selector block 73 must move in the opposite direction from neutral i. e. to the right, as viewed in Figure 11. Since there is ordinarily only one reverse speed, and there may be several speeds ahead, it will be seen upon inspection of Figure 11 that there is room for the selector to move only a limited extent to the left and to move a relatively great extent to the right.

From the foregoing it will be seen that the movement of the selector in the embodiment shown is governed by the compression on the spring 86, and this in turn depends upon the setting of the handle 104 on the segment 106. It will furthermore be seen that no operation of the selector is possible until the carriage 41 has been moved by depression of the clutch pedal to the limit of its travel to the left as viewed in Figures 8 and 9. When the carriage 41 has been moved to the left by depression of the clutch pedal the selector may then move through the operation of the spring, and upon the return movement of the carriage that cam A, B, C, or D, which has been set into alinement with one of the operating levers 37 and 38 will engage such lever and depress or raise it, as the case may be. Accordingly, two conditions are necessary to effect any shifting of the gears; one condition is that there must be a setting of the control lever 104 such as to cause movement of the selector and the other condition is that there must be a depression of the clutch pedal.

No matter how many times the clutch pedal is operated, no change in the gear setting will be effected unless the operation of the clutch is preceded by a change in the position of the control lever 104, but no change in the position of the control lever 104 can be effective for changing the position of the selector until the clutch pedal is operated.

In starting a motor vehicle, it is customary for the engine to be started with the gears in neutral. The gears are then shifted by going first in to low gear then in to second and then in to high. This sequence is followed in the present gear shift mechanism. The driver, upon starting the engine moves the lever 104 from the neutral position, (Fig. 19) to the high gear position marked "H" in Figure 19. This operation, through the mechanism hereinbefore described, pulls the yoke 87 (Fig. 11) to the right as far as it will move. This places the spring 86 under maximum compression so that the spring will be effective for moving the selector block 73 toward the right as viewed in Figure 11 to the maximum limit of its movement. Obviously however, the selector should not be free to move immediately upon operation of the clutch pedal from the neutral position to the high speed position. An escapement mechanism is provided whereby the selector must shift the gears upon the first actuation of the clutch pedal to the low speed position, upon the next operation of the clutch pedal to the second speed position and the following operation to the high speed position.

The escapement mechanism is such however that it is possible to go directly from the high speed position to neutral directly without going from high to second and second to low and low to neutral.

Figure 7:
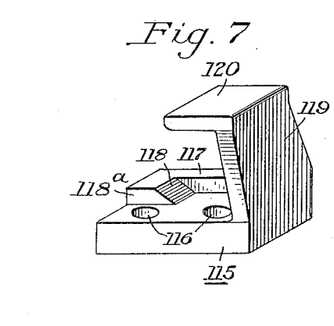
Figure 7 is a detail view of the detent setting and releasing mechanism forming a part of the mechanism.

One part of the escapement mechanism is mounted for movement with the selector and comprises a stop element of the peculiar shape shown in the perspective view in Figure 7. This stop element designated generally as 115 has a base portion having holes 116 therein by means of which it is bolted to the top of the selector block 73. On the base portion of the block is a vertical shoulder or abutment 117, and to one side of this shoulder is an inclined cam surface 118. At one end of the block is a vertical web 119 having an overhanging flange 120. The flange 120 is spaced well above the base of the block.

Figure 14:
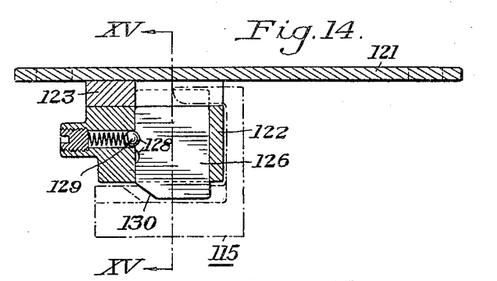
Figure 14 is a transverse section showing in detail part of the mechanism shown in Figure 9, this view being a full scale drawing of the detent pins by means of which step by step operation is secured.
Figure 15:
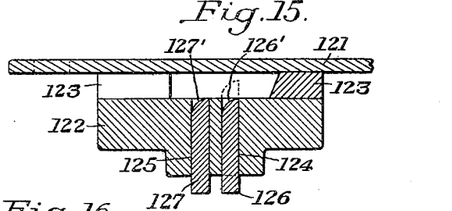
Figure 15 is a section in the plane of line XV—XV of Figure 14.
Figure 16:
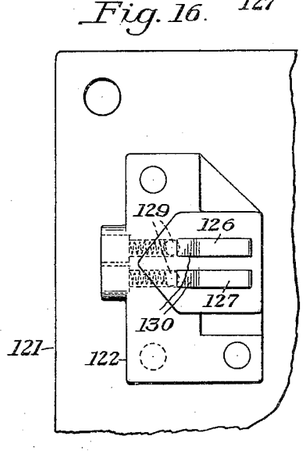
Figure 16 is an inverted plan view of the part shown in Figure 14.

This stop element is adapted for cooperation with movable dogs. In the particular construction shown in the drawings a portion of the casing has a movable cover plate 121 (see particularly Figs. 9, 14, 15 and 16). Carried on the underside of the cover plate 121, as best shown in Figures 14, 15 and 16, is a block 122. This block is held in spaced relation to the cover plate by means of spacers 123. In the block 122 are vertical slots 124 and 125. Slidably seated in each of these slots is a dog 126 and 127 respectively. Each dog is movable vertically in its slot from a lower position to an upper position, as indicated in dotted lines in Figures 14 and 15. Each of these dogs has spaced apart notches 128 therein with which a spring pressed ball 129 is adapted to cooperate, this ball providing a yieldable detent for releasably holding the dog in its upper or lower position. In the lower position of the dog, the lower end portion projects below the bottom of the block 122, as clearly shown in Figures 14 and 15, while the upper end of the dog is flush with the top of the block. When the dog is in its upper position the lower end of the dog is substantially flush with the bottom of the block 122, while the upper end of the dog projects into the space between the top of the block 122 and the cover plate 121. Each of the dogs has a beveled corner portion 130 on the bottom thereof, this corner being on the side of the dog away from the selector block 73. The top edge of each of the dogs is rounded, as indicated at 126' and 127'.

The position of the dogs with reference to the selector is such that the flange 120 of the stop block 115 is adapted to project into the space between the top of the block 122 and the cover plate 121 when the carriage is moved to the left to the limit of its travel from the position shown in Figure 9. This is indicated by the chain line position of the stop block 115 as shown in Figure 14. The lower ends of the dogs 126 and 127 are adapted to engage the transverse abutment 117 on the stop block 115 while the inclined surface 118 on the block 115 is adapted for cooperation with the beveled corner 130 of each of the dogs.

The operation of the escapement may now be followed. When the carriage 41 is moved to the left, as viewed in Figure 9, the selector block 73 of course moves to the left with it, as does all the mechanism associated with the selector and mounted on the carriage. As soon as the teeth 110 on the bottom of the selector block are free of the notch 113 of the selector guide 112 the selector would be free to move under the influence of the spring 86. The end of the inclined portion 118 provides an abutment 118a which is adapted to contact with the lower ends of the dogs 126 and 127. This is best shown in Fig. 9 where the portion 118a is seen to overlap or lie behind the end of the dog. When the carriage 41 is moved to the left from the position shown in Figure 9 to the full limit of its travel the portion 118a will ride past the obstructing portion of the dog to the chain line position shown in Figure 14. The selector may then move to the right as viewed in Figure 11 until the obstructing portion of the dog engages the transverse abutment 117. The selector can then move no further. When the carriage 41 moves to the right, as shown in Fig. 9, the inclined portion 118 will engage the inclined corner 130 of the first dog 126 and lift this dog to its upper position. However, before the first dog 126 is moved out of the way one of the teeth 110 will be engaged with the slot 113 in the member 112 and the portion 118a of the stop block will also be against the obstructing portion of the second dog 127. Upon the next operation of the clutch pedal to move the carriage 41 to the left, as viewed in 39, the operation will be repeated, the selector moving to the right as viewed in Figure 11 until the transverse abutment 117 lies against the obstructing portion of the second dog 127. When the carriage 41 returns again to the normal position the inclined portion 118 will function to lift the second dog out of obstructing position.

Upon the next actuation of the clutch pedal to move the carriage 41 to the left as viewed in Figure 9, there will be no further dogs to obstruct the movement of the selector, and the selector will be free to travel under the influence of the spring 86 to the next position, which is the high speed position.

As long as there is no change in the setting of the lever 104, or no other influence exerted on the spring 86 to change the setting of the selector, the clutch pedal may be operated without effecting any change in the gear setting.

If the control handle 104 is in the high speed position and the driver wants to go into neutral he throws the lever 104 back to the neutral notch on the segment. He then depresses the clutch pedal to the full extent. Of course when he changes the setting of the control handle 104 he puts the spring 86 under compression in the reverse direction, which tends to urge the selector in the direction opposite to that which it moved in advancing from neutral to low, low to second and second to high. Consequently when the clutch pedal is depressed and the carriage 41 moved to the left as viewed in Figure 9 following a set of the control handle 104 to the neutral notch the tendency of the spring 86 is to return the selector to the neutral position. When the carriage is thus moved to the left the overhang 120 on the block 115 projects into the space between the top of the block 122 and the cover plate 121. The edge 120a of the overhang 120 is beveled, and when the selector is moved under the influence of the spring toward the neutral position the beveled portion 120a engages the beveled tops of the dogs 127' and 126' and depresses the dogs, returning them to the lowermost position. The dogs therefore offer no obstruction to the movement of the selector from the high speed position to neutral, and the movement of the selector from the high speed position to neutral effects a resetting of the dogs.

The mechanism described is for a gear shift having three speeds ahead. Where there are more forward speeds, more dogs similar to 126 and 127 would be provided. Since, of course, there is only one speed in reverse, the selector needs to move only one step to the left as viewed in Figure 11, so that no escapement mechanism is necessary in shifting into reverse.

Inasmuch as the selector will only move a distance corresponding to the distance that the yoke 87 is moved by the setting of the hand lever 104 it is possible to make any gear shift that is desirable. It is not necessary to always go from high speed back to neutral. For instance, by setting the control handle 104 in the second speed notch the selector will always go to second speed, whether one is shifting from neutral or shifting from high into second. In shifting from neutral into second however the escapement mechanism will always function requiring that the gearing go from neutral to low and low to second.

The ends of the teeth 110 are beveled as indicated at 110', and the entering end of the slot 113 in the member 112 is flared so as to facilitate the entry of one of the teeth 110 into the notch 113. It is not possible with this arrangement for the selector to stop in an intermediate position, as it must always be moved by the pointed ends of the teeth 110 and of the notch 113 into a definite predetermined position.

As previously pointed out any shifting of the gears from one position to another requires the movement of the operating levers 37 and 38 to a neutral position preceding the shift, just as occurs in the usual hand gear shift.

Because of the provision of the spring 86 between the shifting yoke 87 and the selector block 73 it is possible to set the control handle 104 in the desired segment, and the gears will then shift automatically when the clutch pedal is fully depressed but not until then. For instance, in the usual course of driving it is common practice to go along in high gear, and when traffic conditions require, to go into second and then back into high. With the present invention after the driver has gotten the car into high gear, he can set the handle 104 in the second gear notch on the segment and continue to drive in high gear. He may drive for miles before it becomes necessary to go in to second, but just as soon as the occasion demands he has merely to depress the clutch pedal to its limit and the transmission will shift in to second gear. Just as soon as he has shifted into second he can set the lever back in high so that as soon as traffic conditions permit, the depression of the clutch pedal will put the car back in high gear. Likewise the arrangement is convenient in traveling where there are traffic lights or traffic control of any kind. The driver may approach the intersection where a traffic sign is against him, throw the lever 104 to the neutral notch, immediately set the gearing in neutral, and then with the traffic lights still against him set the lever 104 in the high speed position. As soon as the traffic signal is in his favor, he can operate the clutch pedal, go into low, operate it again, go into second and operate it again and he is in high speed and when he is starting and picking up he does not have to give any conscious attention to the shifting of gears.

The lost motion arrangement between the clutch pedal and the gear shift slide plate 53 allows for free play of the clutch pedal to engage and disengage the clutch without actually shifting the gears, as this is sometimes desirable in the usual course of driving.

The invention contemplates the provision of any mechanism for placing the spring which operates the selector under compression to effect operation of the selector in either direction, and is not confined to the particular mechanism comprising the control lever 104 herein specifically described. The arrangement possesses a considerable advantage over automatic gear shifts as heretofore proposed in the provision of a selector, a yoke, and a yieldable element interposed between the yoke and the selector for transmitting motion from the yoke to the selector, this yieldable element allowing the movement of the yoke at any time, the mechanism allowing the movement of the selector only upon depression of the clutch pedal. The invention permits a greater ease in the driving of a car because the operator can set the hand lever 104 in advance of the time when he wants to make the shift, and shift by depressing the clutch pedal. He does not have to synchronize the depression of the clutch pedal with any movement of the hand lever, as in the ordinary manual gear shift. The gear shift is quiet, because the gears cannot be forced into mesh, this being executed gradually by the operation of the levers 37 and 38 under the influence of the cams A, B, C, or D. The cams are of course moved by the carriage 41, which is returned to the normal position by the springs connected with the clutch pedal. While the movement of the carriage 41 to the normal position is effected by the springs attached to the clutch pedal, these springs are sufficiently yieldable that the carriage will not apply any considerable pressure in bringing the gears into mesh. Coupled with the synchronizing arrangement including the friction pins 22, the shifting is executed easily and silently. By reason of the teeth 110 entering the notch 113 in the fixed guide 112 it is not possible for the selector to move or for the gears to shift except upon sufficient depression of the clutch pedal. Accidental or spontaneous shifting is therefore not possible.

While the description of the mechanism is necessarily involved, the mechanism is relatively simple in its construction and can be built into a gear shift with relatively little additional expense. When it is observed that Figures 10 and 11 show the full size of the parts, it will be seen that the mechanism is compact and it does not require a great deal of space under the floor of the car.

While I have specifically shown and described one embodiment of my invention, it will be understood that this is merely by way of illustration and that various changes and modifications may be made therein within the contemplation of my invention and under the scope of the following claims.

I claim:

1. In a variable speed transmission, gear changing mechanism, a transversely and longitudinally movable selector for effecting the operation of the gear changing mechanism, an operating yoke for operating the selector to effect transverse movement thereof, a resilient means operatively interposed between the yoke and the selector for effecting movement of the selector in accordance with the movement of the yoke, means for normally restraining the selector against transverse movement, means adapted to be operated by a clutch pedal for moving the selector out of engagement with said restraining means, and means cooperating with the selector for imparting a step-by-step movement thereto in one direction only.

2. In an automobile transmission including a clutch pedal and a variable speed transmission gear, gear changing mechanism, a carriage operatively connected with the clutch pedal and adapted to be moved by depression of the clutch pedal from a normal position to a gear changing position, a selector mounted on the carriage, movable transversely thereof, a spring for transmitting motion to the selector, an adjustable yoke also movable transversely to the direction in which the carriage moves for operating the spring, means for operating the yoke, means for restraining the selector against motion when the carriage is in the normal position, and permitting motion of the selector relatively to the carriage when the carriage is in the gear changing position, and an escapement mechanism providing a step-by-step movement of the selector in one direction whereby the selector will move to shift the gears in sequence from neutral to high upon successive operations of the clutch pedal.

3. In an automobile transmission including a clutch pedal and a variable speed transmission gear, a gear changing mechanism, a carriage operably connected with the clutch pedal and adapted to be moved upon depression of the clutch pedal from a normal position to a gear changing position, a selector on the carriage movable transversely thereof adapted to cooperate with the gear changing mechanism, a manually operable means for actuating the selector, a spring operably interposed between said operating means and the selector for transmitting motion from the former to the latter, means for holding the selector against actuation by the spring while the carriage is in normal position, said means being inoperative when the carriage is in gear shifting position, and an escapement mechanism for the selector to prevent the full movement of the selector through the spring upon a single operation of the clutch pedal.

4. In a variable speed transmission including a clutch pedal and a variable speed transmission gear, gear changing elements for shifting the gears, a carriage operatively connected with the clutch pedal and adapted to be reciprocated upon depression of the clutch pedal from a normal to a gear changing position and upon release of the clutch pedal to return from the gear changing to the normal position, a selector movably mounted on the carriage and adapted to be reciprocated with the carriage and to be moved relatively thereto, a spring for moving the selector, a shifting yoke for tensioning the spring and movable in either direction from a neutral position by means of which the spring may be compressed to move the selector in either direction from a given position, means for operating the shifting yoke, means cooperating with the selector for holding the selector against movement under the compression of the spring while the carriage is in normal position, said means being ineffective when the carriage is in gear shifting position, said selector having a plurality of cams thereon for cooperation with said gear changing elements, said cams being adapted to selectively engage and operate said elements upon movement of the carriage from the gear changing to the normal position.

5. In a variable speed transmission including a clutch pedal and a variable speed transmission gear, gear changing elements for shifting the gears, a carriage operatively connected with the clutch pedal and adapted to be reciprocated upon depression of the clutch pedal from a normal to a gear changing position and upon release of the clutch pedal to return from the gear changing to the normal position, a selector movably mounted on the carriage and adapted to be reciprocated with the carriage and to be moved relatively thereto, the spring for moving the selector, a shifting yoke for tensioning the spring and movable in either direction from a neutral position by means of which the spring may be compressed to move the selector in either direction from a given position, means for operating the shifting yoke, means cooperating with the selector for holding the selector against movement under the compression of the spring while the carriage is in normal position, said means being ineffective when the carriage is in gear shifting position, said selector having a plurality of cams thereon for cooperation with said gear changing elements, said cams being adapted to selectively engage and operate said elements upon movement of the carriage from the gear changing to the normal position, and means for positively moving the gear changing elements to neutral position, upon movement of the carriage from normal to gear changing position.

6. In a transmission including a clutch pedal and a variable speed transmission gear a pair of gear shifting elements through which a shifting of the gears may be effected, said elements being movable in each of two directions from a normal position, a selector operatively connected with the clutch pedal movable toward and away from said elements and having cam surfaces thereon adapted to selectively engage the elements to move them in one direction or the other from the neutral position when the selector is moving toward the elements, means on the selector for positively returning the elements to the neutral position when the selector is moving away from the elements, means operable only when the selector is moved away from the elements for changing the position of the selector relatively to the elements, said selector being also movable transversely of said elements for bringing different cam surfaces into lever engagement position, and means for effecting such transverse movement of the selector.

7. In a variable speed transmission, gear changing mechanism, a selector effective for shifting the gear changing mechanism, a spring adapted to move the selector, a yoke for operating the spring, a hand control for shifting the yoke, a clutch pedal, means preventing movement of the selector by the spring when the clutch pedal is in a normal position, and an escapement permitting the movement of the selector from high speed position to neutral position upon a single operation of the clutch pedal but requiring a succession of operations of the clutch pedal to secure movement of the selector from the neutral position to the high speed position.

8. In a variable speed transmission including a clutch pedal and a speed changing gear, a selector movable in one direction from a neutral position to a gear reversing position, and movable in another direction from a neutral position through a succession of forward speed positions, a spring for effecting movement of the selector, and an escapement mechanism for causing the selector to move in a step-by-step progression from the neutral position to the high speed position, said escapement comprising a stop element on the selector, a plurality of dogs independently movable from an obstructing position to an inoperative position and arranged for cooperation with the stop element, means on the selector for successively moving the dogs out of obstructing position, and other means on the selector for resetting the dogs upon movement of the selector from the high speed position toward the neutral position.

9. In a variable speed transmission including a clutch pedal and a speed changing gear, a carriage operatively connected with the clutch pedal and adapted to be moved upon depression of the clutch pedal from a normal position to a gear shifting position and to move upon release of the clutch pedal from the gear changing position to the normal position, a selector on the carriage movable transversely across the carriage, said selector being movable in one direction from a neutral position to effect a reverse gear change, said selector being movable in the other direction across the carriage from neutral position through a plurality of intermediate gear stations to a high speed position, an escapement mechanism for causing the selector to stop at each intermediate station in moving from neutral toward the high speed position, said escapement mechanism including a plurality of dogs movable from an operative to an inoperative position, a stop member on the selector adapted to abut in the movement of the selector against the dogs when the dogs are in the operative position, said dogs being positioned to stop the selector at the intermediate stations, and means effective upon the movement of the carriage from the gear changing to the normal position for moving an obstructing dog from the operative to the inoperative position, and means on the selector for resetting the dogs upon movement of the selector from the high speed toward the neutral position.

10. In a mechanism of the class described, a movable selector, an escapement for the mechanism comprising a stop member on the selector having an abutment and a cam surface, movable dogs adapted for cooperation with the stop member having a portion for engagement with the abutment and a portion for engagement with the cam surface, said selector being movable in two directions with respect to the dogs, and means on the selector for resetting the dogs after they have been moved by engagement with the cam surface of the stop member of a selector.

11. In a mechanism of the class described, an adjustable yoke having a bushing slidably received in each end thereof, said bushing having flanged inner ends adapted to contact with the yoke, a spring confined between the flanged ends of the bushing, a slidable selector block, and means connected with the slidable selector block bearing against the ends of said bushings, and means for adjusting the yoke whereby the spring may be put under compression to effect a movement of the selector block through said bushings.

12. In a variable speed transmission, a plurality of gear shifting levers having flared end portions, a non-rotatable selector for cooperation with the levers having two series of cams thereon, one series being arranged along one side of the selector and one series along the other side thereof, the cams of one series being staggered with respect to the other, means for moving the selector back and forth with respect to the levers to effect operation of the levers when one of the cams registers with one of the levers, and means for moving the selector transversely of the direction in which it reciprocates for changing the alignment of the cams with respect to the operating levers, said selector having cut-away portions therein opposite the cams to provide clearance for the flared ends of the operating levers, said cut-away portions also providing cams for returning the levers to a normal position when the selector is moved in a direction away from the operating levers.

13. In a gear shifting mechanism of the class described, a plurality of shifting levers having flared terminal portions, a selector for operating said levers comprising a U-shaped member into which the flared terminal portions of said levers extend and between the side walls of which the flared terminal portions of the levers have an operating fit, and spaced-apart cam surfaces on the side walls of said U-shaped member on the inside thereof, the cam surfaces on one of the side walls being out of alinement with those cam surfaces on the other side wall, said side wall portions having recesses therein opposite the cam surfaces to accommodate the flared end of a terminal portion which is engaged by a cam surface, shifting mechanism operated by the movement of said levers, means for moving the selector toward and away from the levers to cause the cam surfaces to engage the terminal portions of the levers, and means for selectively moving the selector transversely with respect to the levers to bring a predetermined cam surface into operative relation with a predetermined lever terminal, the flared terminal portions of the lever being in engagement with said member at all times.

In testimony whereof I have hereunto set my hand.

JOSEPH J. SZEPE.